United States Patent
Merkel et al.

(10) Patent No.: US 7,371,363 B2
(45) Date of Patent: May 13, 2008

(54) METHODS OF PURIFYING HYDROGEN FLUORIDE

(75) Inventors: Daniel C. Merkel, West Seneca, NY (US); HsuehSung Tung, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/620,018

(22) Filed: Jul. 15, 2003

(65) Prior Publication Data

US 2005/0013764 A1 Jan. 20, 2005

(51) Int. Cl.
*C01B 7/19* (2006.01)
*C07C 17/38* (2006.01)

(52) U.S. Cl. .............. 423/488; 423/242.1; 423/243.01; 423/210; 423/483; 570/177

(58) Field of Classification Search ................ 423/488, 423/483, 242.1, 243.01, 210; 570/177
See application file for complete search history.

(56) References Cited

U.S. PATENT DOCUMENTS

| | | | | |
|---|---|---|---|---|
| 2,942,036 A | | 6/1960 | Smith et al. ................ | 260/653 |
| 3,873,629 A | * | 3/1975 | Jones ......................... | 570/177 |
| 4,944,846 A | | 7/1990 | Manzer et al. ................ | 203/1 |
| 5,211,817 A | | 5/1993 | Adams et al. ................ | 203/82 |
| 5,763,706 A | * | 6/1998 | Tung et al. ................... | 570/167 |
| 5,874,658 A | * | 2/1999 | Belter ......................... | 570/180 |
| 5,895,639 A | | 4/1999 | Swain et al. ................. | 423/483 |
| 5,918,481 A | | 7/1999 | Pham et al. ................... | 62/631 |
| 6,328,907 B1 | | 12/2001 | Nakada et al. ................ | 252/67 |

FOREIGN PATENT DOCUMENTS

| | | | |
|---|---|---|---|
| CA | 684687 | 4/1964 | .............. 260/658.1 |
| EP | 0 381 986 | 8/1990 | |
| EP | 0 467 531 | 1/1992 | |
| EP | 0 472 391 | 2/1992 | |
| GB | 1052118 | 12/1966 | |
| JP | 2-272086 | 11/1990 | |
| WO | WO 95/04022 | 2/1995 | |
| WO | WO 97/15540 A | 5/1997 | |

OTHER PUBLICATIONS

Weast, R.C., Editor, Handbook of Chemistry and Physics, 52nd Edtition, 1971 (no month), p. D-222.*
"Distllation", Wikipedia, the free encyclopedia, pp. 1-9.*

* cited by examiner

*Primary Examiner*—Ngoc-Yen Nguyen
(74) *Attorney, Agent, or Firm*—Colleen D. Szuch

(57) ABSTRACT

Provided are methods of producing anhydrous hydrogen fluoride comprising: providing a mixture comprising hydrogen fluoride and at least one halogenated hydrocarbon; and extracting hydrogen fluoride from the mixture by contacting the mixture with a solution of less than about 93 wt. % sulfuric acid solution in water.

16 Claims, No Drawings

US 7,371,363 B2

METHODS OF PURIFYING HYDROGEN FLUORIDE

FIELD OF INVENTION

The present invention provides methods of recovering anhydrous hydrogen fluoride from a product stream comprising hydrogen fluoride and a halogenated hydrocarbon compound by extraction with sulfuric acid.

BACKGROUND OF THE INVENTION

Hydrofluorocarbons ("HFCs") and hydrochlorofluorocarbons ("HCFCs") are highly desirable for use in a wide range of applications including various solvent, refrigerant, blowing agent, aerosol propellant applications, and the like. Because HFCs and HCFCs tend to exhibit lesser (or no) ozone-depleting characteristics, and tend to be less flammable and less toxic than many chlorine-containing compounds (such as hydrochlorocarbons or chlorofluorocarbons) used conventionally in the aforementioned applications, HFCs and HCFCs have found increasing use as substitutes for conventional chlorine-containing compounds. In light of such increasing use, applicants have recognized a growing need for the efficient and cost-effective production of HFCs and HCFCs.

Many conventional methods of producing HFCs and/or HCFCs involve reacting hydrogen fluoride ("HF") with one or more chlorinated compounds to produce a reaction product stream comprising the desired HFC or HCFC, as well as, unreacted HF, other starting reagents, and undesirable by-products. For example, WO 95/04022, incorporated herein by reference, describes the synthesis of 1,1,1,3,3-pentafluoropropane ("HFC-245fa," an HFC further described in U.S. Pat. No. 2,942,036, Canadian Patent No. 684,687, EP 381986A, and JP 2,272,086) including the steps of reacting HF with 1,1,1,3,3,3-hexachlororopropane to produce 1-chloro-1,1,3,3,3-pentafluoropropane and converting such HCFC to HFC-245fa. For any of the methods described above to be relatively efficient and cost-effective, it is desirable that not only the HFC/HCFC product be isolated in good yield and purity, but also that any unreacted HF be isolated and recovered with relatively good purity for recycle and reuse in subsequent reactions. Unfortunately, while some relatively pure HF can be recovered and separated from the product streams of conventional methods using conventional distillation techniques, there is usually a significant portion of HF which cannot be separated, especially where the HF forms an azeotropic or azeotrope-like mixture with the target HFC/HCFC in a product stream. In addition, while conventional aqueous scrubbing techniques can be used to remove HF from an HFC/HCFC product stream to produce purified HFC/HCFC product, such techniques are destructive to the HF which results in less recycle of HF, and thus, less efficiency of the process and higher cost to replace the lost HF.

In an attempt to avoid at least some of the aforementioned problems associated with distillation and aqueous scrubbing, the prior art has suggested a number of methods of separating HF and/or HFC/HCFC products from azeotrope-like mixtures thereof. For example, European patent application EP 472,391 discloses a method of separating 1,1,1,2-tetrafluoroethane ("HFC-134a") from a mixture containing hydrochlorofluorocarbons using an extraction agent such as trichloroethylene or perchloroethylene, among others. European patent application EP 467,531 discloses a method of separating HFC-134a from a mixture of HFC-134a and HF by passing the mixture through a distillation column to form a residue of pure HFC-134a. U.S. Pat. No. 5,211,817 discloses a process of separating fluorocarbons from azeotropic mixtures with HF by column distillation wherein a vapor sidestream is withdrawn and introducing the sidestream into a rectifying column equipped with a condenser which is operated at a high reflux ratio. U.S. Pat. Nos. 4,944,846, 5,918,481, and 6,328,907 attempt to use pressure swing distillation to achieve separation of azeotropic mixtures of HFCs/HCFCs and HF. Unfortunately, the aforementioned methods are disadvantageous in that they tend to exhibit limited effectiveness in separation and/or are cost prohibitive.

U.S. Pat. No. 5,895,639 ("the '639 patent"), discloses a method of separating hydrogen fluoride from a fluorocarbon/hydrogen fluoride azeotropic mixture using sulfuric acid, particularly concentrated sulfuric acid (about 98 wt. % or greater). While such method may offer some advantages in HF separation over the aforementioned conventional separation methods, nevertheless applicants have achieved certain unexpected and dramatic improvements in HF separation over the methods of the '639 patent. Such unexpected and improved methods are the subject of the present invention.

All of the documents cited hereinabove are incorporated by reference in their entirety.

DESCRIPTION OF PREFERRED EMBODIMENTS

According to certain preferred embodiments, the present invention provides methods of recovering HF from a mixture comprising HF and a halogenated hydrocarbon using relatively dilute sulfuric acid. As used herein, the term "relatively dilute sulfuric acid" or "dilute sulfuric acid" refers generally to a sulfuric acid solution comprising less than about 93 weight % of sulfuric acid, based on the total weight of the solution, with remainder of the solution being water. Certain preferred dilute sulfuric acid solutions include solutions of from about 50 to 90 wt. % sulfuric acid, more preferably from about 50 to about 87 wt. %, even more preferably from about 50 to 85 wt. %, and even more preferably from about 50 to 82 wt. %. Other preferred dilute sulfuric acid solutions include solutions of from about 55 to 85 wt. %, more preferably from about 60 to about 85 wt. %, even more preferably from about 65 to about 85 wt. % and even more preferably from about 75 to about 85 wt. %. In certain especially preferred embodiments, the sulfuric acid comprises about 80% sulfuric acid, with the remainder of the solution being water. The term "concentrated sulfuric acid", as used herein, refers generally to sulfuric acid comprising 93 wt. % or more of sulfuric acid, based on the total weight of the solution, with remainder of the solution being water. Certain preferred concentrated sulfuric acids comprise from about 98 to about 100 wt. % sulfuric acid.

Applicants have discovered unexpectedly that relatively dilute sulfuric acid can be used to great advantage according to the present methods to recover anhydrous HF having a purity that is significantly higher than is achievable using concentrated sulfuric in conventional recovery methods, and, in certain embodiments, higher than is available in commercial anhydrous HF products. For example, applicants have discovered that the present methods can be used to obtain anhydrous HF having less than half, preferably less than 1/3, more preferably, less than 1/4, and even more preferably, less than 1/5, the amount of sulfur-containing compound impurities ("sulfur impurities") associated with anhydrous HF obtained using concentrated sulfuric acid in the methods of the '639 patent, or via other conventional recovery methods. For example, a first sample of anhydrous HF was prepared according to certain embodiments of the present invention using a sulfuric acid solution comprising about 80 wt. % sulfuric acid and 20 wt. % water (based on total weigh of the solution) and a second comparable sample was prepared using 93 wt. % sulfuric acid following the procedure described in the '639 patent. Based on the test work performed by applicants, the HF recovered following the procedure described in the '639 patent contained greater than about 1000 ppm of sulfur impurities. In contrast, the HF recovered according to one embodiment of the present invention surprisingly contained only 37 ppm sulfur impurities, representing a reduction in sulfur impurities of over 96%. This significant reduction in sulfur impurities represents a highly-dramatic and non-linear deviation from the amount of impurities that would be expected based on the relatively high amounts of sulfur impurities associated with anhydrous HF obtained using concentrated sulfuric acid extraction methods.

Furthermore, applicants have discovered surprisingly that the relatively low amount of sulfur impurities associated with the HF obtained via the present invention tends to be even lower than the amounts of sulfur impurities found in certain commercially available anhydrous HF products. For example, the present methods have been used to obtain anhydrous HF having levels of sulfur impurities lower than samples of electronic grade anhydrous HF purchased form Air Products and Chemicals, Inc. Three samples form separate 90 lbs. net cylinders of said electronic grade anhydrous HF were analyzed by ICPOES, which showed the level of sulfur impurity in the samples to be 110 ppm, 46.7 ppm, and 38.7 ppm, respectively.

Applicants have further discovered that the dilute acid methods of the present invention are advantageous over conventional methods in that surprisingly lower amounts of total organic compound impurities (i.e. tar, expressed in TOC—Total Organic Carbons) are produced during extraction of the HF as compared to concentrated acid extraction methods. In a continuous extraction process using sulfuric acid, the presence and build up of tar in the sulfuric acid layer requires periodic purging of the sulfuric acid/tar mixture from, and adding fresh sulfuric acid to, the system to effectively obtain anhydrous HF product. The lower the amounts of tar produced during extraction, the less purge of sulfuric acid required to obtain anhydrous HF product. Therefore, the production of lower amounts of tar in an extraction process allow for more efficient and cost-effective methods of recovering anhydrous HF. Applicants have discovered that, in certain embodiments, the methods of the present invention result in as little as ½ or less the amount of tar produced via methods of the '639 patent using sulfuric acid in concentrations of 93 wt. % or more. For example, applicants extracted HF from two comparable mixtures comprising HF and 1,1,1,3,3-pentafluoropropane using two different sulfuric acid solutions, one comprising 80 wt. % sulfuric acid and one comprising 93 wt. %. Applicants discovered that the sulfuric acid layer extracted using 93 wt. % of sulfuric acid contained about 1216 ppm of tar, while the layer extracted using 80 wt. % contained only 500 ppm of tar.

In light of the above, applicants note that "relatively pure anhydrous hydrogen fluoride" obtained via the present invention comprises HF containing sulfur impurities in an amount of about 200 ppm or less. Preferably, relatively pure anhydrous hydrogen fluoride recovered via the present methods contains less than about 100 ppm, and more preferably less than about 75 ppm of sulfur impurities. In addition, the sulfuric acid layer obtained in the process preferably contains less than about 5000 ppm of TOC impurities, more preferably less than about 3000 ppm, even more preferably less than about 1000 ppm, and even more preferably about 500 ppm or less of TOC impurities.

Accordingly, in certain embodiments, the present invention provides methods of recovering relatively pure anhydrous hydrofluoric acid from a mixture comprising hydrogen fluoride and a halogenated hydrocarbon comprising: providing a mixture comprising hydrogen fluoride and at least one halogenated hydrocarbon; and extracting hydrogen fluoride from said mixture with dilute sulfuric acid to provide anhydrous hydrogen fluoride.

Furthermore, although applicants do not wish to be bound by or to any particular theory of operation, upon subsequent investigation of the unexpected results described above, applicants now believe that the increased amount of water present in the methods of the present invention over the concentrated acid methods contributes, at least in part, to the unexpectedly low amounts of sulfur impurities. In light of such discovery, applicants have recognized that anhydrous HF having surprisingly fewer sulfur impurities than HF produced via the methods of the '639 patent can be obtained via methods of the present invention comprising: providing a mixture comprising hydrogen fluoride and at least one halogenated hydrocarbon; extracting hydrogen fluoride from said mixture with concentrated sulfuric acid to provide an acid/HF mixture; flash distilling said acid/HF mixture to provide a first HF product; adding water to the first HF product to form a diluted HF mixture; and distilling said diluted HF mixture to obtain relatively pure anhydrous hydrogen fluoride.

Methods Using Dilute Sulfuric Acid

In certain preferred embodiments, the methods of the present invention using dilute sulfuric acid comprise providing a mixture comprising HF and at least one halogenated hydrocarbon. As used herein, the term "halogenated hydrocarbon" refers generally to a hydrocarbon compound having at least one halogen substituent thereon. For example, certain preferred halogenated hydrocarbons include hydrofluorocarbons, hydrochlorofluorocarbons, and the like.

Any suitable mixture of HF and at least one halogenated hydrocarbon may be provided according to the methods of the present invention. In certain preferred embodiments, the provided mixture comprises HF and at least one halogenated hydrocarbon selected from the group consisting of hydrofluorocarbons, hydrochlorofluorocarbons, and mixtures thereof. Examples of suitable HFCs include 1,1,1,3,3-pentafluoropropane ("HFC-245fa"), 1,1,1,2-tetrafluoroethane ("HFC-134a"), pentafluoroethane ("HFC-125"), 1,1,1,3,3-pentafluorobutane ("HFC-365mfc"), 1,1,1,3,3,3-hexafluoropropane ("HFC-236fa"), difluoromethane ("HFC-32"), mixtures of two or more thereof, and the like. Certain preferred HFCs include HFC-245fa, and the like. Examples of suitable HCFCs include 1-chloro-1,2,2,2-tetrfluoroethane ("HCFC-124"), 1,1-dichloro-2,2,2-trifluoroethane ("HCFC-123"), chlorodifluoromethane ("HCFC-22"), mixtures of two or more thereof, and the like.

The HF and halogenated hydrocarbon(s) present in the provided mixture may be present in any suitable amounts. In certain embodiments, the HF and halogenated hydrocarbon are present in amounts sufficient to produce an azeotropic or azeotrope-like relationship between at least a portion of the HF and halogenated hydrocarbon. In other embodiments, the HF and halogenated hydrocarbon are present only in non-azeotropic or non-azeotrope-like amounts. Applicants have recognized that in certain preferred embodiments, the advantages of the present invention are most greatly exploited when at least a portion of the HF and halogenated hydrocarbon mixture is azeotropic or azeotrope-like in nature.

While applicants envision the use of a wide range of HF/halogenated hydrocarbon mixtures to be provided according to the present invention, in certain preferred embodiments, the mixture comprises a reaction product mixture obtained by a process comprising reacting HF with a chlorinated starting compound to form a halogenated hydrocarbon. Preferably, the reaction product mixture for use in the present invention is produced by a process comprising the reaction of HF with an HCFC or a hydrochlorocarbon ("HCC") to produce an HFC, HCFC, or combinations of two or more thereof. For example, Table 1 below shows a number of chlorinated starting compounds and the HFC or HCFC products that can be produced by reacting the starting compounds with HF. Any of such chlorinated starting materials can be reacted with HF to provide a product mixture comprising an HFC or HCFC as shown suitable for use in the present invention. In such embodiments, in addition to HF and at least one HFC or HCFC, the provided mixture may further contain other unreacted starting materials, by-products, and/or impurities from the reaction source.

TABLE 1

Chlorinated Materials and HFCs/HCFCs Derived Therefrom

| Chlorinated Starting Material | HFC/HCFCs formed via reaction with HF |
|---|---|
| 1,1,1,3,3-pentachloropropane | HFC-245fa |
| 1,1,1,2-tetrachloroethane | HFC-134a |
| perchloroethylene | HFC-125, HCFC-123, HCFC-124 |
| chloroform | HCFC-22 |
| 1,1,1,3,3-pentachlorobutane | HFC-365mfc |
| 1,1,1,3,3,3-hexachloropropane | HFC-236fa |
| methylene chloride | HFC-32 |
| 1,1,1-trichloroethane | HFC-143a |

The provided HF/halogenated hydrocarbon mixture may be provided by any available source according to the present invention. In certain preferred embodiments, the providing step comprises providing the HF/halogenated hydrocarbon mixture directly to a dilute sulfuric acid extraction process of the present invention as part of an integrated production facility, for example, an HFC or HCFC production facility.

The HF/halogenated hydrocarbon mixture from which anhydrous HF is extracted in accordance with the present invention can be a gas phase stream, a liquid phase stream, or a combination of liquid and gas phases. In certain preferred embodiments, the mixture of the present invention is a gas phase stream.

The methods of the present invention further comprise the step of extracting HF from the provided mixture using dilute sulfuric acid. In certain embodiments, the extracting step comprises introducing a stream of dilute sulfuric acid to the provided HF/halogenated hydrocarbon mixture to dissolve at least a portion of the HF therein. As will be readily understood by those of skill in the art, due at least in part to the solubility/polarity characteristics of the sulfuric acid, HF, and halogenated hydrocarbon(s), upon introducing dilute sulfuric acid to an HF/halogenated hydrocarbon mixture, two separable phases typically form: an upper phase which is rich in the halogenated hydrocarbon, and a lower sulfuric acid phase which is rich in HF. The term "rich" as used herein refers to a phase containing more than 50% by weight of the indicated component (based on the total amount originally present in the provided mixture). Preferably, a phase rich in a particular component comprises at least about 80% of that component, and even more preferably at least about 90%.

Any suitable dilute sulfuric acid as defined above, in a gaseous, liquid or combination gas/liquid state, may be used to extract HF according to the present methods. In certain preferred embodiments, the dilute sulfuric acid is provided as a gaseous or liquid stream, more preferably as a liquid stream.

Any suitable amount of sulfuric acid can be used to extract HF from the provided mixture according to the present invention. As will be understood by those of skill in the art, the amount of sulfuric acid used depends at least in part on the amount of HF present in the provided mixture and the solubility of HF in the dilute sulfuric acid used. In certain preferred embodiments, the weight ratio of sulfuric acid to HF used is from about 0.5:1 to about 20:1. In certain more preferred embodiments, the weight ratio is from about 1:1 to about 15:1, even more preferably from about 1:1 to about 10:1, and even more preferably from about 2:1 to about 8:1.

The sulfuric acid stream may be introduced to the provided stream via any suitable method. For example, a liquid stream of sulfuric acid may be introduced to the provided gaseous or liquid stream by pouring, decanting, injecting, pumping, or otherwise contacting the sulfuric acid stream with the provided stream in an open or closed vessel, such as, a packed column, a standard scrubbing tower, beakers, flasks, and the like. Gaseous phase sulfuric acid may be introduced to the provided stream, for example, by flowing the sulfuric acid into any suitable container containing the provided mixture, such as, an open or closed vessel, a packed column, a standard scrubbing tower, and the like, or by flowing a stream of sulfuric acid countercurrent to a provided mixture stream. In certain preferred embodiments, the extraction step comprises introducing a liquid stream of dilute sulfuric acid to a gaseous provided mixture by introducing the sulfuric acid to the top of a packed column into which the provided mixture is introduced from the bottom of the column. As will be recognized by those of skill in the art, in such preferred embodiments, the liquid acid stream will tend to travel down the column, while the gaseous provided mixture will tend to travel up the column such that the two streams will contact each other and at least a portion of the HF in the provided mixture will be dissolved into the sulfuric acid.

After the dilute sulfuric acid and provided mixture streams are introduced to form two separable phases, the phases are then separated and HF is recovered from the bottom sulfuric acid phase. Any suitable method of separating can be used. For example, suitable liquid phase separation techniques include decanting, siphoning, distillation, and the like. Suitable methods for gas-phase or combination gas/liquid phase separation include introducing the streams into a packed column, as described hereinabove, wherein top gas phase exits one direction (usually top) and bottom phase other direction (usually bottom), or other known methods of gas-phase gas/liquid phase separation.

In certain embodiments, the HF produced according to the present methods may be further purified using conventional methods known to those skilled in the art. For example, aqueous washes, drying, concentrating under reduced pressure, distillation, and the like may be used.

According to certain preferred embodiments, the HF extracted from the provided mixture as described above is further distilled to produce relatively pure anhydrous HF. Any suitable method of distillation may be used in the present invention. Examples of suitable distillation techniques include flash distillation, fractionation, combinations of two or more thereof, and the like. Preferably, distillation of the extracted HF according to the present invention comprises flash distillation, fractionation, or combinations thereof. In certain more preferred embodiments, the present methods involve both flash distillation and conventional column fractionation distillation.

Any distillation conditions and apparatus effective to flash distill HF from a mixture comprising HF and dilute sulfuric acid can be used according to the present methods. For example, suitable distillation temperatures include temperatures of from about 60° C. to about 250° C. at atmospheric pressure. Certain preferred distillation temperatures include those of from about 80° C. to about 200° C., more preferably 100° C. to about 160° C., and even more preferably from about 120° C. to about 140° C. at atmospheric pressure. Any suitable flash distillation apparatus used conventionally may be adapted for use in the present methods. In light of the disclosure herein, those of skill in the art will be readily able to remove HF from an extraction layer comprising HF and dilute sulfuric acid without undue experimentation.

Any of a wide range of conventional column fractionation distillation apparatus and techniques can be used according to the present invention to obtain relatively pure anhydrous HF from either an extraction layer comprising HF and dilute sulfuric acid or from an HF product obtained from a flash distillation step according to the present invention. For example, suitable distillation temperatures include temperatures of from about 16° C. to about 85° C. at atmospheric pressure. Certain preferred distillation temperatures include those of from about 19° C. to about 75° C., more preferably from about 19.5° C. to about 65° C. at atmospheric pressure. Pressure is not critical, atmospheric, superatmospheric, and subatmospheric are acceptable, but atmospheric or slightly higher than atmospheric pressures are preferred.

Concentrated Acid Methods

As indicated above, applicants have further discovered that concentrated sulfuric acid can be used according to certain embodiments of the present invention to recover anhydrous HF having a surprisingly lower amount of sulfur impurities than would be expected based on the teachings of the '639 patent. In certain embodiments, the present concentrated acid methods comprise providing a mixture comprising HF and at least one halogenated hydrocarbon; extracting HF from said mixture with concentrated sulfuric acid to provide an extracted acid/HF mixture; flash distilling the extracted acid/HF mixture to form a first HF product; adding water to the first HF product to form a diluted HF product; and distilling said diluted HF product to obtain anhydrous hydrogen fluoride.

The steps of providing a mixture and extracting HF from the mixture according to the present embodiments may be performed as described above, with the exception that concentrated sulfuric acid is used in place of dilute sulfuric acid. In addition, any suitable flash distillation techniques as described above may be used to distill the extracted acid/HF mixture to form a first HF product.

Water from any suitable source may be added to the HF product formed via flash distillation according to the present invention. Preferably, the water is pure enough so that it does not introduce any significant impurities additional to those already present in the reaction and extraction system.

Any suitable amount of water may be added according to the present methods. As will be recognized by those of skill in the art, the amount of water added will depend on a number of factors including, for example, the amount of HF present in the first HF product to be distilled. Preferably, the amount of water added to the first HF product is effective to reduce the amount of sulfur impurities present in the distillation overhead of a subsequent distillation relative to the amount present in a distillation without the added water. Suitable amounts of water include, for example, from about 0.1 to about 20 wt. %, more preferably from about 0.25 to about 10 wt. %, and even more preferably, from about 0.5 to about 5 wt. %, based on the total amount of HF product.

Any conventional column fractionation distillation procedures are suitable for use in distilling a diluted HF product to produce anhydrous HF according to the present invention. Those of skill in the art will be readily able to adapt such conventional distillation procedures for use herein without undue experimentation.

EXAMPLES

Reference is made to the following examples which are intended to be illustrative of the invention, but are not intended to be limiting in scope.

Example 1

This example illustrates the recovery of anhydrous HF from a mixture of HF and HFC-245fa according to certain preferred embodiments of the present invention.

A mixture consisting of about 75 wt. % HFC-245fa and about 25 wt. % HF is vaporized and fed to the bottom of a packed column at a feed rate of about 2.9 lbs per hour for about 4 hours. A stream of about 80 wt. % sulfuric acid (80/20 $H_2SO_4/H_2O$) with about 4% HF dissolved therein is fed continuously to the top of the same packed column at a feed rate of about 5.6 lbs per hour during the same time frame. A gaseous stream exiting the top of the column comprises HFC-245fa with less than 1.0 wt. % HF therein. The concentration of HF in the sulfuric acid in the column bottoms increases from 4.0 wt. % to about 15 wt. %.

The column bottoms containing sulfuric acid and about 15 wt. % HF is collected and charged into a 2 gallon teflon vessel. The mixture is heated to about 140° C. to vaporize and flash off HF product, which is collected. The collected HF product contains 6000 ppm water and 217 ppm sulfur. The sulfuric acid contains about 500 ppm of TOC (total organic carbon).

The HF collected from flash distillation is distilled in a distillation column and anhydrous HF is recovered. The recovered anhydrous HF contains about 43 ppm of sulfur impurities.

Comparative Example 1

This examples illustrates the recovery of anhydrous HF from a mixture of HF and HFC-245fa using 93 wt. % sulfuric acid.

The procedure as described in Example 1 is repeated except that 93 wt. % sulfuric acid is used. After extraction, the concentration of HF in the sulfuric acid is about 15 wt. %. After flash distillation, the HF collected contains about 635 ppm of water and greater than 7300 ppm of sulfur. The sulfuric acid contains about 1216 ppm of TOC. After distillation in a distillation column, the anhydrous HF obtained contains about 213 ppm of sulfur impurities.

Example 2

This examples illustrates the recovery of anhydrous HF from a mixture of HF and HFC-245fa by extracting with 93 wt. % sulfuric acid, flash distilling, adding water to the distilled HF, and then distilling in a column according to certain embodiments of the present invention.

The extraction and flash distillation procedure as described in Example 1 is repeated except that 93 wt. % sulfuric acid is used. After extraction, the concentration of HF in the sulfuric acid is about 15 wt. %. After flash distillation, the HF collected contains about 635 ppm of water and greater than 7300 ppm of sulfur. The sulfuric acid contains about 1216 ppm of TOC. Water is added to the collected HF to make a batch of crude HF solution containing 1 wt. % of water, based on the total solution. The crude HF solution was distilled using conventional distillation techniques to recover anhydrous HF containing about 111 ppm of sulfur.

Comparative Example 2

This examples illustrates the recovery of anhydrous HF from a mixture of HF and HFC-245fa using 98 wt. % sulfuric acid.

The extraction procedure described in example 1 was repeated using 98 wt. % sulfuric acid. After extraction, the concentration of HF in the sulfuric acid is about 15 wt. %. No flash distillation is conducted.

Desorption of HF was conducted in a distillation column with a reboiler temperature of about 110-140° C. Anhydrous HF is recovered as a distillate and contains greater than 1000 ppm of sulfur.

What is claimed is:

1. A method of recovering anhydrous hydrogen fluoride from an azeotrope or azeotrope-like mixture comprising hydrogen fluoride and a halogenated hydrocarbon comprising:
   providing an azeotrope or azeotrope-like mixture comprising hydrogen fluoride and at least one halogenated hydrocarbon;
   extracting hydrogen fluoride from said mixture by contacting said mixture with a solution comprising from about 65 to less than 93 wt. % sulfuric acid in water; and
   subjecting the hydrogen fluoride extracted in said extraction step to flash distillation followed by column fractionation distillation to produce anhydrous hydrogen fluoride containing less than 200 ppm of sulfur impurities.

2. The method of claim 1 wherein said sulfuric acid solution comprises from about 65 to about 85 wt % of sulfuric acid based on the total weight of the sulfuric acid solution.

3. The method of claim 1 wherein said sulfuric acid solution comprises from about 75 to about 85 wt % of sulfuric acid based on the total weight of the sulfuric acid solution.

4. The method of claim 1 wherein said sulfuric acid solution comprises about 80 wt % of sulfuric acid based on the total weight of the sulfuric acid solution.

5. A method of recovering anhydrous hydrogen fluoride from a mixture comprising hydrogen fluoride and a halogenated hydrocarbon comprising:
   providing a mixture comprising hydrogen fluoride and at least one halogenated hydrocarbon selected from the group consisting of hydrochlorofluorocarbons, hydrochlorocarbons, and combinations thereof;
   extracting hydrogen fluoride from said mixture by contacting said mixture with a solution comprising from about 65 to less than 93 wt. % sulfuric acid in water; and
   subjecting the hydrogen fluoride extracted in said extraction step to flash distillation followed by column fractionation distillation to produce anhydrous hydrogen fluoride containing less than 200 ppm of sulfur impurities.

6. The method of claim 5 wherein said halogenated hydrocarbon is selected from the group consisting of 1-chloro-1,2,2,2-tetrfluoroethane ("HCFC-124"), 1,1-dichloro-2,2,2-trifluoroethane ("HCFC-123"), chlorodifluoromethane ("HCFC-22"), and mixtures of two or more thereof.

7. The method of claim 1 wherein said mixture comprising hydrogen fluoride and at least one halogenated hydrocarbon is a reaction product mixture obtained by reacting hydrogen fluoride with a chlorinated starting compound.

8. The method of claim 7 wherein said chlorinated starting compound is selected from the group consisting of 1,1,1,3,3-pentachloropropane, 1,1,1,2-tetrachloroethane, perchloroethylene, chloroform, 1,1,1,3,3-pentachlorobutane, 1,1,1,3,3,3-hexachloropropane, methylene chloride, and 1,1,1-trichloroethane.

9. The method of claim 7 wherein said chlorinated starting compound comprises 1,1,1,3,3-pentachloropropane.

10. The method of claim 1 wherein the anhydrous hydrogen fluoride produced contains less than about 100 ppm of sulfur impurities.

11. The method of claim 10 wherein the anhydrous hydrogen fluoride produced contains less than about 75 ppm of sulfur impurities.

12. The method of claim 1 wherein the sulfuric acid layer obtained via the extraction step contains less than about 5000 ppm of TOC impurities.

13. The method of claim 1 wherein the sulfuric acid layer obtained via the extraction step contains less than about 3000 ppm of TOC impurities.

14. The method of claim 1 wherein the sulfuric acid layer obtained via the extraction step contains less than about 1000 ppm of TOC impurities.

15. A method of producing anhydrous hydrogen fluoride comprising:
   providing a mixture comprising hydrogen fluoride and at least one halogenated hydrocarbon;
   extracting hydrogen fluoride from said mixture with a solution of at least 98 wt. % sulfuric acid in water to provide an acid/HF mixture;
   flash distilling said acid/HF mixture to provide a first HF product; adding water to the first HF product to form a diluted HF mixture; and distilling said diluted HF mixture to obtain anhydrous hydrogen fluoride.

16. The method of claim 5 wherein said sulfuric acid solution comprises from about 65 to about 85 wt % of sulfuric acid based on the total weight of the sulfuric acid solution.

* * * * *